United States Patent [19]

Keske et al.

[11] 4,291,149

[45] Sep. 22, 1981

[54] INJECTION MOLDABLE AMIDE IMIDE COPOLYMERS AND TERPOLYMERS

[75] Inventors: Robert G. Keske; James R. Stephens, both of Naperville, Ill.

[73] Assignee: Standard Oil Company (Indiana), Chicago, Ill.

[21] Appl. No.: 112,651

[22] Filed: Jan. 16, 1980

[51] Int. Cl.³ .................. C08G 69/26; C08G 69/32
[52] U.S. Cl. .................. 528/188; 260/33.4 P; 264/325; 264/328.17; 264/331.19; 528/125; 528/128; 528/172; 528/173; 528/185; 528/189; 528/226; 528/229; 528/335; 528/337; 528/348; 528/350; 528/352
[58] Field of Search ............ 528/350, 172, 173, 185, 528/188, 189, 226, 229, 335, 337, 348, 352, 125, 128

[56] References Cited

U.S. PATENT DOCUMENTS

| | | | |
|---|---|---|---|
| 2,421,024 | 5/1947 | Summit | 528/350 |
| 3,654,227 | 4/1972 | Dine-Hart | 528/350 |
| 3,661,863 | 5/1972 | Campbell | 528/350 |
| 3,748,304 | 7/1973 | Stephens | 528/350 X |
| 3,817,942 | 6/1974 | Kovacs et al. | 528/350 |
| 3,842,026 | 10/1974 | Dixon et al. | 528/229 X |
| 3,862,092 | 1/1975 | Flowers et al. | 528/350 |
| 4,048,144 | 9/1977 | Stephens | 528/188 X |
| 4,066,631 | 1/1977 | Dimmig | 528/350 |

FOREIGN PATENT DOCUMENTS

570858 7/1945 United Kingdom .............. 528/350

Primary Examiner—Howard E. Schain
Attorney, Agent, or Firm—Gunar J. Blumberg; William T. McClain; William H. Magidson

[57] ABSTRACT

Novel tailor made copolymers and terpolymers of the amide-imide type are prepared from tricarboxylic acid anhydride compounds, N,N'-diacylated diamines, N-acylated diamines, and primary diamines. These copolymers and terpolymers are useful for preparing injection molded articles of superior properties. A novel process for the manufacture of amide-imide copolymers and terpolymers is disclosed wherein the imide, imide-imide, amide, and amide-imide moieties incorporated into the polymer backbone are controlled by acylating the amine functionality which is to form the amide and amide-amide moieties while reacting directly those diamines with a tricarboxylic anhydride compound which are intended to form the imide and imide-imide moieties.

36 Claims, No Drawings

INJECTION MOLDABLE AMIDE IMIDE COPOLYMERS AND TERPOLYMERS

BACKGROUND OF THE INVENTION

1. Field of the Invention

The field of this invention relates to tailor made amide-imide copolymers and terpolymers prepared from tricarboxylic acid anhydride derivatives, N,N'-diacylated diamines, N-acetylated diamines and diamines and to molding powders and molded articles prepared therefrom.

2. Background

Amide-imide polymers and copolymers are a relatively new class of organic compounds known for their solubility in nitrogen containing solvents when in the polyamic acid form. The major application of these amide imides has been as wire enamels. This is illustrated in U.S. Pat. Nos. 3,817,942 (1974), 3,661,832 (1972), 3,494,890 (1970) and 3,347,828 (1967). Amide-imide polymers and copolymers have also been found useful for molding application as shown in U.S. Pat. Nos. 4,016,140 (1977) and 3,573,260 (1971). Both are incorporated herein by reference. None of the foregoing references disclose tailor made amide-imide copolymers and terpolymers.

The general object of this invention is to provide tailor made injection moldable tailored linear high molecular weight amide-imide copolymers and terpolymers. A more specific object of this invention is to provide a novel process for preparing injection moldable tailored linear high molecular weight amide-imide copolymers and terpolymers by reacting acylated diamines with tricarboxylic acid anhydrides and diamines, at a temperature of about 50° to 700° F., wherein the imide, imide-imide, amide, amide-amide moieties incorporated into the polymer backbone are controlled by acylating the amine functionality which is to form the amide and amide-amide moieties while reacting directly those diamines with the tricarboxylic anhydride compound which are intended to form the imide and imide-imide moieties of the amide-imide copolymers and terpolymers. The molar ratio of the aromatic to aliphatic, cycloaliphatic and araliphatic diamines are suitably in the range of about 9:1 to 1:1, advantageously in the range of about 3:1 to 3:2.

In the novel process, the amide, amide-amide moieties incorporated into the polymer backbone are controlled by reacting acylated diamines with the tricarboxylic anhydride compound to form amide and amide-amide linkages and by the addition of diamines which form imide or imide-imide linkages. Advantageously these monomers are mixed in the presence of solvents such as N-methylpyrrolidone, N,N-dimethylacetamide, acetic acid, etc.. According to the process of this invention the copolymers and terpolymers may contain from two up to six different structural units set forth hereinbelow:

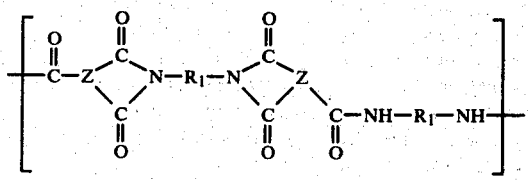

A.

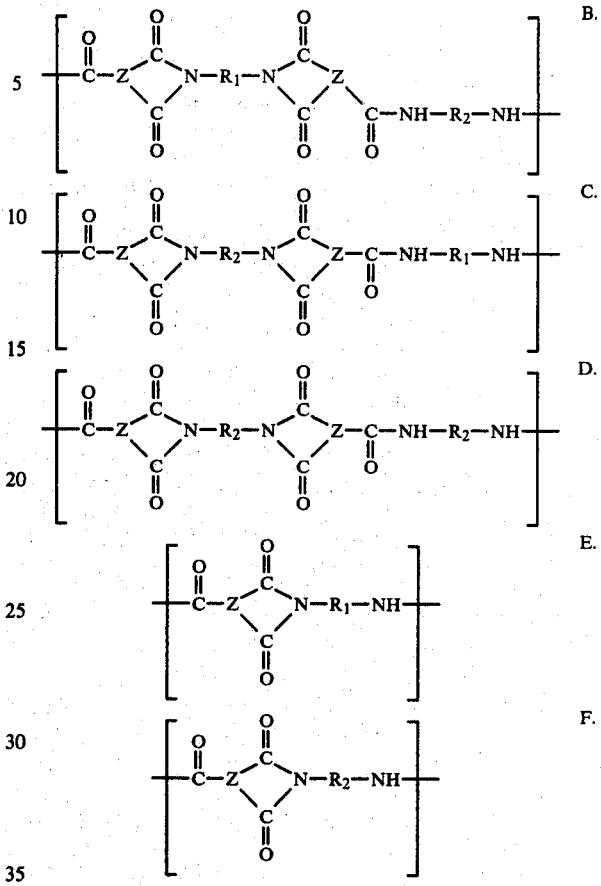

In the foregoing structural units Z is a trivalent aromatic radical. Z may be a trivalent radical of benzene, naphthalene, biphenyl, diphenyl ether, diphenyl sulfide, diphenyl sulfone, ditolyl ether, and the like.

Useful aromatic tricarboxylic acid anhydrides which contribute the trivalent radical moiety of Z include those compounds containing at least one pair of carboxyl groups in the ortho position with respect to each other or otherwise situated in a fashion which permits the formation of an anhydride structure, one other carboxyl group and from 9 to 21 carbon atoms. Within these limits, these compounds may contain one or more benzenoid rings such as, for instance, trimellitic anhydride and its isomers and multi-ring compounds such as the 1,8-anhydride of 1,3,8-tricarboxylnaphthalene. Usually these compounds contain up to three benzenoid rings. The preferred aromatic tricarboxylic acid anhydride employed in the novel process is trimellitic anhydride.

$R_1$ is a divalent aromatic radical of six to twenty carbon atoms joined directly or containing stable linkages consisting of —S—, —O—,

—SO$_2$—, —CO—, or methylene radicals. Aromatic diamines include para- and metaphenylenediamine, para- and meta-xylenediamine, oxybis (aniline), thiobis (aniline), sulfonylbis (aniline), diaminobenzophenone, methylenebis (aniline), benzidine, 1,5-diaminonaphthalene, oxybis (2-methylaniline), thiobis (2-methylaniline), and the like. Examples of other useful aromatic primary diamines are set out in U.S. Pat. No. 3,494,890 (1970) and U.S. Pat. No. 4,016,140 (1977), both incorporated herein by reference.

$R_2$ is a divalent aliphatic, cycloaliphatic or araliphatic radical of from two to eighteen carbon atoms derived from aliphatic diamines such as ethylenediamine, propylenediamine, 2,2-dimethylpropylene diamine, tetramethylene diamine, hexamethylene diamine, octamethylene diamine, nonamethylene diamine, decamethylene diamine, dodecamethylene diamine, 4,4'-diaminodicyclohexylmethane, xylylene diamine.

Utilizing the novel process, seven different classes of amide-imide copolymers and terpolymers have been prepared. Suitably each copolymer and terpolymer is prepared utilizing both aromatic and aliphatic diamines. Usually the molar ratio of the aromatic to aliphatic diamines is in the range of 9:1 to 1:1. Advantageously, this range has been found to be 3:1 to 3:2. The copolymers and terpolymers have structural units as shown in Table I hereinbelow.

TABLE I

| POLYMER CLASS | STRUCTURAL UNITS |
|---|---|
| I | A, B |
| II | A, C |
| III | A, B, C, D |
| IV | A, B, E |
| V | A, C, E |
| VI | A, B, C, D, E |
| VII | A, B, C, D, E, F |

In the polymers of Classes I, II, and III the tricarboxylic acid anhydride group in the polymer is ordered head to head and tail to tail due to the order of the acylation of the diamines. The polymer of Class I is suitably prepared by diacylating of the aliphatic, cycloaliphatic or araliphatic diamine and part of the aromatic diamine. The remainder of the aromatic diamine is reacted with two equivalents of the tricarboxylic acid anhydride compound to produce a bis imide/bis acid intermediate. The reaction between the bis imide/bis acid and the diacetyl derivative of the aromatic diamine produces Structural Unit A. In a similar manner the reaction between the bis imide/bis acid and the diacetyl derivative of the aliphatic, cycloaliphatic or araliphatic diamine produces Structural Unit B. The random dispersion of structural units A and B along the copolymer and terpolymer backbone thus make up the complete structure of Polymer I. When the polymer is further polymerized under solid state polymerization conditions at a temperature of about 450° to 700° F. a high molecular weight injection moldable copolymer and terpolymer is obtained having inherent viscosity in the range of 0.3 to 2.0. For the purpose of this invention inherent viscosity is measured at 25° C. and 0.5% w/v in 60/40 w/w phenol/1,1,2,2, tetrachloroethane. The term "solid state polymerization" refers to chain extension of polymer particles under conditions where the polymer particles retain their solid form and do not become a fluid mass.

The copolymers and terpolymers of Class II are similar to polymers of Class I, but in this instance the aliphatic, cycloaliphatic and araliphatic diamine moieties are used to form imide groups (Structural Unit C) and the aromatic diamines are used to form either two amide groups (Structural Unit A) or two imide groups (Structural Unit C). The resulting Class II copolymers and terpolymers are made up of random units A and C. Class III copolymers and terpolymers are made up of Structural Units A, B, C and D and have all the trimellitoyl groups ordered head to head and tail to tail and all diamines are allowed either to form two amide groups or two imide groups.

In copolymers and terpolymers of Class IV, V, and VI the aliphatic, cycloaliphatic and araliphatic diamines are used to form only di imide or di amide groups (Structural Units B, C, and D). Thus the trimellitoyl groups which are attached to the aliphatic or araliphatic diamines are ordered head to head or tail to tail. The aromatic diamines are acylated randomly thus some are diacylated while others are monoacylated or unacylated. The trimellitoyl groups which are attached to two aromatic diamine groups are randomly distributed between a head to head, a tail to tail, or a head to tail sequence (Structural Unit E). Polymer VI is similar to the polymers of Class V except that in polymers of Class VI the aliphatic diamines are used in both di imide or di amide formation. Polymers of Class VII are fully random in that both aliphatic diamine and aromatic diamine moieties are distributed between imide and amide portions and all trimellitoyl groups are free to be arranged head to head, tail to tail or head to tail. All of the foregoing polymers have an inherent viscosity in the range of 0.3 to 2.0 dl/g giving them molecular weights in the range of about 3,000 to 100,000. All these polymers can be injection molded and can be used as engineering plastics. They have excellent mechanical properties as shown in Table IV hereof.

With the use of Table II, a general method of preparation of these different polymers is herewith given. Polymers of structural classes I, II, III, V, and VII are prepared by first mixing and reacting the ingredients of columns J, K, and L usually in the presence of a solvent. If the acylating agent is active (e.g. an acid anhydride), reaction will occur readily at room temperature. When slow to react acylating agents (e.g. acetic acid) are used, this mixture must generally be heated to effect the proper amount of condensation. The reactants from columns P, Q, and R can be premixed, prereacted, or added separately to the prereacted mixture of J, K, and L. The solvent is removed by distillation and the mixture is polymerized under melt polycondensation conditions to yield the tailored polymer. Polymers of structural classes IV and VI are prepared by first mixing and reacting the ingredients of columns K and L, usually in the presence of a solvent. If the acylating agent is active (e.g. an acid anhydride), reaction will occur readily at room temperature. This is then followed by the addition of the ingredient from column P. After this mixture has reacted, the ingredients from columns Q and R can be added separately or in a premixed or prereacted form. When slow to react acylating agents are used (e.g. acetic acid), the mixture of K and L must generally be heated to effect the proper amount of condensation. After the addition of the ingredient from column P, a further period of heating will be required to effect the proper amount of condensation. After this mixture has reacted, the ingredients from columns Q and R can be added separately or in a premixed or prereacted form. The solvent is removed by distillation and the mixture is polymerized under melt polycondensation conditions to yield the tailored polymer. In many cases, the melt prepared polymers from all structural classes are preferably solid state polymerized prior to fabrication.

TABLE II

| Structural Class | J Moles of ArDA | K Moles of RDA | L Moles of Acylating Agent Same as TMA | P Moles of ArDA | Q Moles of RDA | R Moles of TMA |
|---|---|---|---|---|---|---|
| I   | $\frac{X}{2} - T$ | T | X | $\frac{X}{2}$ | O | X |
| II  | $\frac{X}{2}$ | O | X | $\frac{X}{2} - T$ | T | X |
| III | $\frac{X}{2} - M$ | M | X | $\frac{X}{2} - T + M$ | T − M | X |
| IV  | O | T | X | Y | O | X |
| V   | Y | O | X | O | T | X |
| VI  | O | M | X | Y | T − M | X |
| VII | Y | T | X | O | O | X |

Acylating Agents include Acetic Anhydride, Acid or Propionate, etc.
X = total moles TMA
Y = total moles ArDA
T = total moles RDA
X = Y + T
TMA = Trimellitic Anhydride
ArDA = Aromatic Diamine
RDA = Aliphatic Diamine
O < M < T < Y By way of particular example, if it is desired to produce an amide imide copolymer and terpolymer of Structural Class V wherein the ratio of aromatic to aliphatic diamines is 3 to 1 requires that X=4, Y=3 and T=1, 3 moles of the aromatic diamine are acylated with 4 moles of the acylating agent, which may be acetic acid, acetic anhydride or propionic anhydride or any aliphatic acid or anhydride which contains from 2 to 10 carbon atoms. 4 moles of trimellitic compound are mixed or reacted with 1 mole of aliphatic diamine, or added separately to the acylated diamine mixture. The mixing is conducted in the presence of solvents such as N-methylpyrrolidone, N,N-dimethylacetamide, acetic acid, etc. The organic polar solvent is removed by distillation and the mixture is polymerized under melt polymerization conditions to yield an injection moldable copolymer and terpolymer of Class V. The novel process enables one to tailor the polymerization so that different structural classes can be incorporated depending on the properties desired in the resulting product. These copolymers and terpolymers have an inherent viscosity of 0.3 to 2.0 and heat deflection temperatures greater than 350° F. without the use of fillers or fiber reinforcements. Although the first stage melt polymerization products have an IV of at least 0.2 dl/gram and can be used for injection molding application, it is generally preferable to start with a copolymer having been solid state polymerized or further melt polymerized.

The solid state polymerization which can be carried out below the melting point of the polymer can be conducted in several ways. However, all of the techniques require heating the ground or pelletized copolymers and terpolymers below the polymer melting point, generally at a temperature of about 400° to 550° F., while either sparging with an inert gas, such as nitrogen or air, or operating under vacuum.

According to the novel process of this invention linear, high molecular weight copolymers and terpolymers have been prepared containing both aromatic and aliphatic moieties by a melt process. This in itself is a novel process feature since the prior art teaches only interfacial and solution polymerization techniques for the production of fully ordered head to head, tail to tail and completely random amide-amide polymers. Furthermore, according to the novel process a method for tailor making amide-imide copolymers and terpolymers has been disclosed. These copolymers and terpolymers have excellent mechanical and thermal properties and can be readily injection molded. This injection moldability of these polymers can be partially contributed to the fact that these polymers are linear and are not cross linked. Injection molding of the copolymers and terpolymers is accomplished by injecting the polymer into the mold maintained at a temperature of about 150°–400° F. In this process a 0.1–2.0 minutes cycle is used with a barrel temperature of about 425° F. to 650° F. The injection molding conditions are given in Table III.

TABLE III

| | |
|---|---|
| Mold Temperature | 150–400° F. |
| Injection Pressure | 1000–40,000 psi and held for 0.5–10.0 seconds |
| Back Pressure | 0–500 psi |
| Cycle Time | 6–120 seconds |
| Extruder: | |
| Nozzle Temperature | 425° F. to 650° F. |
| Barrels: | |
| Front heated to | 425° F. to 650° F. |
| Screw: | |
| 10–200 revolutions/minute | |

The mechanical properties of the copolymers and terpolymers prepared in Examples 1–10 are given in Table IV.

TABLE IV

MECHANICAL PROPERTIES OF COPOLYMERS AND TERPOLYMERS

| Polymer Class | ASTM Method | V | IV | VII | V | IV | IV | VII | V | V |
|---|---|---|---|---|---|---|---|---|---|---|
| ArDA/RDA | | MBA/-HMDA | MBA/-HMDA | MBA/-HMDA | MBA/-MXDA | MBA/-MXDA | MPDA/-HMDA | MPDA/-HMDA | OBA/-MXDA | OBA/-MXDA |

TABLE IV-continued

MECHANICAL PROPERTIES OF COPOLYMERS AND TERPOLYMERS

| Polymer Class | ASTM Method | V | IV | VII | V | IV | IV | VII | V | V |
|---|---|---|---|---|---|---|---|---|---|---|
| ArDA/RDA ratio | | 3/1 | 3/1 | 3/1 | 3/1 | 3/1 | 3/1 | 3/1 | 3/2 | 2/1 |
| Tensile Strength, psi | D-638 | 17,100 | 13,100 | 18,500 | 19,500 | 9,500 | 15,900 | 13,700 | 18,100 | 21,640 |
| Tensile Modulus, psi | D-638 | 360,000 | 361,000 | 363,000 | 408,000 | 405,000 | 437,000 | 450,000 | 472,000 | 488,000 |
| Elongation at Break, % | D-638 | 8.2 | 5.5 | 16.9 | 17.1 | 2.9 | 5.3 | 4.1 | 11.7 | 17.1 |
| Flexural Strength, psi | D-790 | 24,400 | 22,200 | 23,500 | 26,600 | 14,100 | 26,700 | 26,700 | 28,400 | 30,200 |
| Flexural Modulus, psi | D-790 | 501,000 | 451,000 | 460,000 | 527,000 | 508,000 | 584,000 | 573,000 | 586,000 | 614,000 |
| Izod Impact, ft. lb/in notch | D-256 | 0.46 | 0.38 | 1.99 | 0.38 | 0.36 | 0.36 | 0.33 | 0.42 | 0.63 |
| Tensile Impact, ft. lb/in$^2$ | D-1822 | 56.2 | 32.1 | 72.3 | 120 | 6.5 | 50.7 | 48.0 | 56.9 | 38.3 |
| H.D.T. @264 psi, °F. | D-648 | 401 | 398 | 412 | 420 | 415 | 433 | 432 | 413 | 424 |
| Density | | 1.29 | 1.29 | 1.29 | 1.30 | 1.30 | 1.35 | 1.35 | 1.33 | 1.34 |
| Inherent viscosity | | 1.01 | 0.99 | 0.91 | 0.81 | 0.62 | 0.92 | — | 1.26 | 1.41 |
| Example # | | 1 | 5 | 9 | 6 | 7 | 4 | 10 | 2 | 8 |

ArDA = Aromatic diamine
RDA = Aliphatic diamine
MBA = Methylenebisaniline
HMDA = 1,6-Hexanediamine
MXDA = Metaxylylenediamine.
OBA = Oxybisaniline
MPDA = Metaphenylenediamine The following Examples illustrate the preferred embodiments of this invention. It will be understood that these Examples are for illustration purposes only and do not purport to be wholly definitive with respect to the conditions or scope of this invention.

EXAMPLE #1

Preparation of the 4:3:1 TMA:MBA:HMDA Polymer of Structural Class V

A five liter three-necked flask, equipped with a variable speed, mechanical stirrer, nitrogen sparge tube on a pressure-equalizing addition funnel, and a distillation head and condenser was charged with 594 g (3.0 moles) methylenebisaniline and 400 ml of dimethylacetamide (DMAC). The nitrogen sparge and stirring were started and acetic anhydride, 408 g, (4.0 moles) was added over 5 minutes. Trimellitic anhydride, 768 g, (4.0 moles) was added over seven minutes. This was followed by the addition of 116 g (1.0 mole) of 1,6-hexanediamine in 200 ml of DMAC over a period of 5 minutes. The temperature of the spherical heating mantle surrounding the bottom half of the flask was set at 620° F. and the Variac controlling the top half was set at 40. After 105 minutes approximately 950 ml had distilled and the temperature of the bottom half of the mantle was then increased to 690° F. and the Variac to 50. After 25 minutes more, 50 ml more distillate was collected and house vacuum (20 in Hg) was drawn on the system. After 25 minutes under vacuum about 50 ml of distillate was collected and the polymer had become extremely viscous. After cooling and grinding the polymer had an inherent viscosity of 0.44 dl/g in 60:40 w/w phenol:tetrachloroethane or 0.68 dl/g in 100% sulfuric acid @ 25° C. and 0.5% w/v concentration. The polymer was solid state polymerized by heating at 491° F. for 16 hours under high vacuum (0.01 mm Hg). The inherent viscosity increased to 1.01 dl/g in 60:40 w/w phenol:tetrachloroethane @ 25° C. and 0.5% w/v concentration.

The mechanical properties for this polymer are given in Column 1 of Table IV.

EXAMPLE #2

Preparation of the 5:3:2 TMA:OBA:MXDA Polymer of Structural Class V

A five liter three-necked flask, equipped with a variable speed, mechanical stirrer, nitrogen sparge tube on a pressure-equalizing addition funnel, and a distillation head and condenser was charged with 480 g (2.4 mole) of oxybisaniline and 700 ml of acetic acid. The nitrogen sparge (375 cc/min) and stirring were started and acetic anhydride, 408 g, (4 moles) was added over 3 minutes. Trimellitic anhydride, 768 g, (4.0 mole) was added over 6 minutes. This was followed by the addition of 217.6 g (1.6 mole) of metaxylylenediamine over 1 minute. The temperature of the bottom half of the spherical heating mantle surrounding the flask was set at 650° F. and the Variac controlling the top half was set at 30. After 54 minutes 550 ml of distillate had been collected and the temperature was raised to 675° F. After 156 minutes more an additional 590 ml of distillate had been collected, the polymer melt was quite thick. Stirring was continued for 13 minutes under house vacuum (20 in Hg). The polymer was then cooled under nitrogen and ground. The polymer had an inherent viscosity of 0.33 dl/g in 60:40 w/w phenol:tetrachloroethane @ 25° C. and 0.5% w/v concentration. The polymer was solid state polymerized by heating under vacuum (0.40–0.80 mm Hg) for 17 hours @ 490° F. and 16 hrs. at 510° F. During this time the inherent viscosity of the polymer increased to 1.26.

EXAMPLE #3

Preparation of a 4:3:1 TMA:MBA:HMDA Polymer of Structural Class I

A two liter three-necked flask, equipped with a variable speed mechanical stirrer, nitrogen sparge tube on a pressure-equalizing addition funnel, and a distillation head and condenser was charged with 58 g (0.5 mole) 1,6-hexanediamine, 99 g (0.5 mole) methylenebisaniline (MBA) and 400 ml DMAC. The nitrogen sparge (375 cc/min.) and stirrer were started and 204 g (2.0 mole) of acetic anhydride was added over 9 minutes. Trimellitic anhydride, 384 g, (2.0 mole) was added over 2 minutes and followed by the addition of 198 g (1.0 mole) of MBA. The temperature of the bottom half of the spherical heating mantle surrounding the flask was set at 620° F. and the Variac controlling the top half was set at 40. After 90 minutes the polymer was extremely thick and 620 ml had been distilled. Heating was now stopped and the polymer was cooled under nitrogen and then ground. The polymer had an inherent viscosity of 0.11 dl/g in 100% sulfuric acid @ 25° C. and 0.5% w/v concentration. The polymer was solid state polymerized by heating @ 470° F. under high vacuum (0.12 mm Hg) for 17 hours. The inherent viscosity increased to 1.42.

EXAMPLE #4

Preparation of the 4:3:1 TMA:MPDA:HMDA Polymer of Structural Class IV

A five liter three-necked flask equipped as in Example 1 was charged with 324 g (3.0 mole) of metaphenylenediamine and 600 ml of DMAC. The nitrogen sparge (375 cc/min.) and stirring were started and 204 g (2.0 mole) of acetic anhydride was added over 10 minutes. This was followed by the addition of 786 g (4.0 mole) of trimellitic anhydride over 10 minutes. Meanwhile 204 g (2.0 mole) of acetic anhydride had been added to a stirred mixture of 116 g 1,6-hexanediamine and 200 ml of DMAC in a 1 liter three-necked flask under nitrogen. This product was now added over 2 minutes to the mixture in the five liter flask. The temperature of the bottom half of the spherical heating mantle surrounding the flask was set at 620° F. and the Variac controlling the top half was set at 30. After 140 minutes approximately 1150 ml of distillate had been collected and the temperature of the mantle was increased to 660° F. After stirring an additional 25 minutes under atmospheric pressure and 20 minutes under house vacuum (20 in Hg), 150 ml of additional distillate was collected and the polymer was cooled and ground. The polymer had an inherent viscosity of 0.42 (0.5% w/v) in 60:40 w/w phenol:tetrachloroethane @ 25° C. The polymer was solid state polymerized by heating 16 hours @ 471° F. and 16 hrs. @ 515° F. under high vacuum (0.1 to 0.25 mm Hg). The inherent viscosity increased to 0.92. The mechanical properties for this polymer are given in Column 6 of Table IV.

EXAMPLE #5

Preparation of the 4:3:1 TMA:MBA:HMDA Polymer of Structural Class IV

A five liter three-necked flask equipped as in Example 1 was charged with 594 g (3.0 mole) of methylenebisaniline and 600 ml of DMAC. The nitrogen sparge (375 cc/min.) and stirring were started and 204 g (2.0 mole) of acetic anhydride was added over 2 minutes. This was followed by the addition of 768 g (4.0 mole) of trimellitic anhydride over 10 minutes. Meanwhile 204 g (2.0 mole) of acetic anhydride had been added to a stirred mixture of 116 g 1,6-hexanediamine and 200 ml of DMAC in a 1 liter three-necked flask under nitrogen. This product was now added over 2 minutes to the mixture in the five liter flask. The temperature of the bottom half of the spherical heating mantle surrounding the flask was set at 620° F. and the Variac controlling the top half was set at 30. After 100 minutes approximately 1250 ml of distillate had been collected and the temperature of the mantle was increased to 690° F. After stirring an additional 50 minutes under atmospheric pressure and 17 minutes under house vacuum (20 in Hg), 70 ml of additional distillate was collected and the polymer was cooled and ground. The polymer had an inherent viscosity of 0.39 (0.5% w/v) in 60:40 w/w phenol:tetrachloroethane @ 25° C. The polymer was solid state polymerized by heating 15 hours @ 471° F. under high vacuum (0.25 mm Hg). The inherent viscosity increased to 0.99. The mechanical properties for this polymer are given in Column 2 of Table IV.

EXAMPLE #6

Preparation of the 4:3:1 TMA:MBA:MXDA Polymer of Structural Class V

A five liter three-necked flask, equipped with a variable speed, mechanical stirrer, nitrogen sparge tube on a pressure-equalizing addition funnel, and a distillation head and condenser was charged with 594 g (3.0 moles) methylenebisaniline and 700 ml of dimethylacetamide (DMAC). The nitrogen sparge and stirring were started and acetic anhydride 408 g, (4.0 moles) was added over 2 minutes. Trimellitic anhydride (768 g, (4.0 moles) was added over seven minutes. This was followed by the addition of 136 g (1.0 mole) of metaxylylenediamine in 100 ml of DMAC over a period of 2 minutes. The temperature of the spherical heating mantle surrounding the bottom half of the flask was set at 620° F. and the Variac controlling the top half was set at 30. After 72 minutes approximately 1040 ml had distilled and the temperature was then increased to 700° F. After 38 minutes more, 240 ml more distillate was collected and house vacuum (20 in Hg) was drawn on the system. After 5 minutes under vacuum about 20 ml of distillate was collected and the polymer had become extremely viscous. After cooling and grinding the polymer had an inherent viscosity of 0.37 dl/g in 60:40 w/w phenol:tetrachloroethane @ 25° C. and 0.5% w/v concentration. The polymer was solid state polymerized by heating at 505° F. for 18 hours under high vacuum (0.55 mm Hg). The inherent viscosity increased to 0.81 dl/g in 60:40 w/w phenol:tetrachloroethane @ 25° C. and 0.5% w/v concentration. The mechanical properties for this polymer are given in Column 4 of Table IV.

EXAMPLE #7

Preparation of the 4:3:1 TMA:MBA:MXDA Polymer of Structural Class IV

A five liter three-necked flask equipped as in Example 1 was charged with 594 g (3.0 mole) of methylenebisaniline and 600 ml of DMAC. The nitrogen sparge (375 cc/min.) and stirring were started and 204 g (2.0 mole) of acetic anhydride was added over 10 minutes. This was followed by the addition of 768 g (4.0 mole) of trimellitic anhydride over 15 minutes. Meanwhile 204 g (2.0 mole) of acetic anhydride had been added to a stirred mixture of 136 g metaxylylenediamine and 200 ml of DMAC in a 1 liter three-necked flask under nitrogen. This product was now added over 1 minute to the mixture in the five liter flask. The temperature of the bottom half of the spherical heating mantle surrounding the flask was set at 620° F. and the Variac controlling the top half was set at 30. After 64 minutes approximately 1250 ml of distillate had been collected and the temperature of the mantle was increased to 670° F. After stirring an additional 10 minutes under atmospheric pressure and 25 minutes under house vacuum (20 in Hg), the polymer was cooled and ground. The polymer had an inherent viscosity of 0.40 (0.5% w/v) in 60:40 w/w phenol:tetrachloroethane @ 25° C. The polymer was solid state polymerized by heating 16 hours @ 480° F. and 16 hrs. @ 500° F. under high vacuum (0.15 to 0.50 mm Hg). The inherent viscosity increased to 0.62.

EXAMPLE #8

Preparation of the 3:2:1 TMA:OBA:MXDA Polymer of Structural Class V

A five liter three-necked flask, equipped with a variable speed, mechanical stirrer, nitrogen sparge tube on a pressure-equalizing addition funnel, and a distillation head and condensor was charged with 533.3 g (2.67 mole) of oxybisaniline and 700 ml of acetic acid. The nitrogen sparge (375 cc/min) and stirring were started and acetic anhydride, 408 g, (4 moles) was added over 3 minutes. Trimellitic anhydride, 768 g, (4.0 mole) was added over 2 minutes. This was followed by the addition of 181.3 g (1.33 mole) of metaxylylenediamine over 1 minute. The temperature of the bottom half of the spherical heating mantle surrounding the flask was set at 660° F. and the Variac controlling the top half was set at 30. After 24 minutes 360 ml of distillate had been collected and the temperature was raised to 675° F. After 65 minutes more an additional 640 ml of distillate had been collected, the polymer melt was quite thick, and the temperature was increased to 700° F. Stirring was continued for an additional 50 minutes under the nitrogen sparge (160 ml of distillate collected) and 10 minutes under house vacuum (20 in Hg). The polymer was then cooled under nitrogen and ground. The polymer had an inherent viscosity of 0.41 dl/g in 60:40 w/w phenol:tetrachloroethane @ 25° C. and 0.5% w/v concentration. The polymer was solid state polymerized by heating under vacuum (0.40 mm Hg) for 16 hours @ 503° F. and 16 hr. at 510° F. During this time the inherent viscosity of the polymer increased to 1.41.

EXAMPLE 9

Preparation of a 4:3:1 TMA:MBA:HMDA Polymer of Structural Class VII

A five liter three-necked flask equipped as in Example 1 was charged with 116 g (1.0 mole) 1,6-hexanediamine, 594 g (3.0 mole) methylenebisaniline, and 800 ml DMAC. Acetic anhydride, 408 g (4.0 mole) was added over 5 minutes. Trimellitic anhydride, 768 g (4.0 mole) was added over 10 minutes. The temperature of the bottom half of the spherical heating mantle surrounding the flask was set at 620° F. and the Variac controlling the top half was set at 30. After 65 minutes 1050 ml of distillate was collected and the temperature was increased to 670° F. Stirring was continued 40 minutes under the nitrogen sparge (250 ml of distillate collected) and 25 min under house vacuum (20 in Hg, 50 ml of distillate collected). The polymer was then cooled under nitrogen and ground. The polymer had an inherent viscosity of 0.59 dl/g in 60:40 w/w phenol:tetrachloroethane @ 25° C. and 0.5% w/v concentration. The polymer was solid state polymerized by heating under vacuum (0.15–0.50 mm Hg) for 16 hr @ 478° F. and 24 hr @ 500° F. During this time the inherent viscosity increased to 0.91.

EXAMPLE 10

Preparation of a 4:3:1 TMA:MPDA:HMDA Polymer of Structural Class VII

A five liter three-necked flask equipped as in Example 1 was charged with 116 g (1.0 mole) 1,6-hexanediamine, 324 g (3.0 mole) metaphenylenediamine, and 800 ml DMAC. Acetic anhydride, 408 g (4.0 mole) was added over 5 minutes. Trimellitic anhydride, 768 g (4.0 mole) was added over 6 minutes. The temperature of the bottom half of the spherical heating mantle surrounding the flask was set at 620° F. and the Variac controlling the top half was set at 30. After 64 minutes 775 ml of distillate had been collected and the temperature was increased to 670° F. Stirring was continued 45 minutes under the nitrogen sparge (465 ml of distillate collected) and 20 minutes under house vacuum (20 in Hg, 10 ml of distillate collected). The polymer was then cooled under nitrogen and ground. The polymer had an inherent viscosity of 0.49 dl/g in 60:40 w/w phenol:tetrachloroethane @ 25° C. and 0.5% w/v concentration. The polymer was solid state polymerized by heating under vacuum (0.25 mm Hg) for 16 hr @ 518° F. During this time the inherent viscosity increased to 0.82.

We claim:

1. A process for the preparation of tailored linear injection moldable polyamide-imide copolymers and terpolymers containing both aromatic and aliphatic moieties derived from aromatic and aliphatic diamines which process comprises reacting at a temperature of about 50° to 700° F. fully or partially acylated, aromatic or aliphatic diamines with tricarboxylic acid anhydride compounds and aliphatic or aromatic diamines wherein the ratio of the total moles of fully or partially acylated diamines and unacylated diamines to the tricarboxylic acid anhydride compound is 1:1 and about one half of the total amine functionality is acylated.

2. The process of claim 1 wherein the molar ratio of aromatic to aliphatic diamines is about 1:1 to 9:1.

3. The process of claim 1 wherein the tricarboxylic acid anhydride compound is trimellitic anhydride.

4. A process for the preparation of tailored linear injection moldable polyamide-imide copolymers and terpolymers containing both aromatic and aliphatic moieties derived from aromatic and aliphatic diamines which process comprises reacting at a temperature of about 50° to 700° F. fully acylated aromatic or aliphatic diamines with tricarboxylic acid anhydride compounds and aliphatic or aromatic diamines wherein the molar ratio of the acylated diamine: the tricarboxylic acid anhydride: the aliphatic or aromatic diamine is about 5:10:5 (the process of claim 1) wherein the copolymer produced comprises the following structural units:

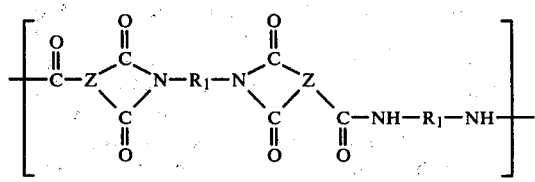

-continued

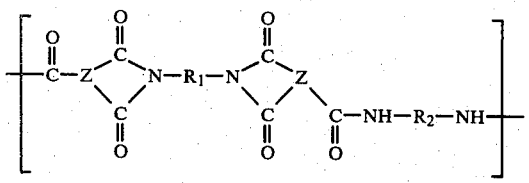

wherein "Z" is a trivalent aromatic radical, R₁ is a divalent aromatic radical of 6 to 20 carbon atoms joined directly or containing stable linkages consisting of —S—, —O—,

—SO₂— —CO— or methylene radicals, R₂ is a divalent aliphatic, cycloaliphatic or araliphatic radical of from 2 to 18 carbon atoms.

5. A process for the preparation of tailored linear injection moldable polyamide-imide copolymers and terpolymers containing both aromatic and aliphatic moieties derived from aromatic and aliphatic diamines which process comprises reacting at a temperature of about 50° to 700° F. fully acylated aromatic or aliphatic diamines with tricarboxylic acid anhydride compounds and aliphatic or aromatic diamines wherein the molar ratio of the acylated diamine: the tricarboxylic acid anhydride: the aliphatic or aromatic diamine is about 5:10:5 (the process of claim 1) wherein the copolymer produced comprises the following structural units:

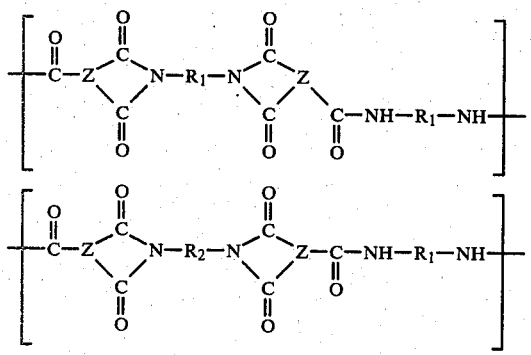

wherein "Z" is a trivalent aromatic radical, R₁ is a divalent aromatic radical of 6 to 20 carbon atoms joined directly or containing stable linkages consisting of —S—, —O—,

—SO₂— —CO— or methylene radicals, R₂ is a divalent aliphatic, cycloaliphatic or araliphatic radical of from 2 to 18 carbon atoms.

6. A process for the preparation of tailored linear injection moldable polyamide-imide copolymers and terpolymers containing both aromatic and aliphatic moieties derived from aromatic and aliphatic diamines which process comprises reacting at a temperature of about 50° to 700° F. fully acylated aromatic or aliphatic diamines with tricarboxylic acid anhydride compounds and aliphatic or aromatic diamines wherein the molar ratio of the acylated diamine: the tricarboxylic acid anhydride: the aliphatic or aromatic diamine is about 5:10:5 (the process of claim 1) wherein the copolymer produced comprises the following structural units:

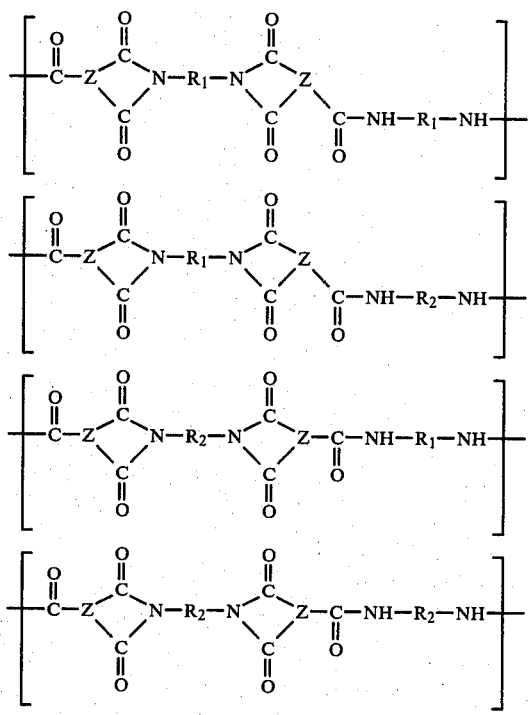

wherein "Z" is a trivalent aromatic radical, R₁ is a divalent aromatic radical of 6 to 20 carbon atoms joined directly or containing stable linkages consisting of —S—, —O—,

—SO₂— —CO— or methylene radicals, R₂ is a divalent aliphatic, cycloaliphatic or araliphatic radical of from 2 to 18 carbon atoms.

7. A process for the preparation of tailored linear injection moldable polyamide-imide copolymers and terpolymers containing both aromatic and aliphatic moieties derived from aromatic and aliphatic diamines which process comprises reacting at a temperature of about 50° to 700° F. fully or partially acylated aromatic or aliphatic diamines with tricarboxylic acid anhydride compounds and aliphatic or aromatic diamines wherein the ratio of the total moles of fully acylated diamines, partially acylated diamines, and unacylated diamines to the tricarboxylic acid anhydride compound is 1:1 and about one half of the total amine functionality is acylated (the process of claim 1) wherein the copolymer produced comprises the following structural units:

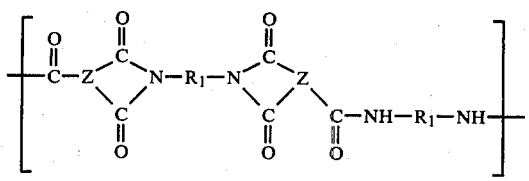

-continued

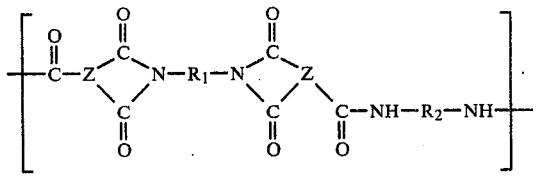

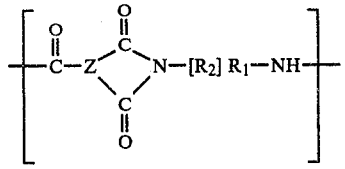

wherein "Z" is a trivalent aromatic radical, R₁ is a divalent aromatic radical of 6 to 20 carbon atoms joined directly or containing stable linkages consisting of —S—, —O—,

—SO₂— —CO— or methylene radicals, R₂ is a divalent aliphatic, cycloaliphatic or araliphatic radical of from 2 to 18 carbon atoms.

8. A process for the preparation of tailored linear injection moldable polyamide-imide copolymers and terpolymers containing both aromatic and aliphatic moieties derived from aromatic and aliphatic diamines which process comprises reacting at a temperature of about 50° to 700° F. fully or partially acylated aromatic or aliphatic diamines with tricarboxylic acid anhydride compounds and aliphatic or aromatic diamines wherein the ratio of the total moles of fully acylated diamines, partially acylated diamines and unacylated diamines to the tricarboxylic acid anhydride compound is 1:1 and at least one half of the total amine functionality is acylated (the process of claim 1) wherein the copolymer produced comprises the following structural units:

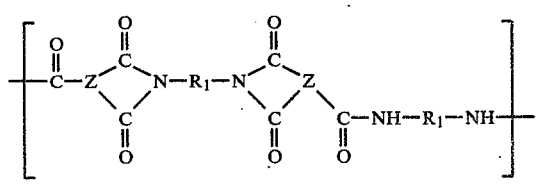

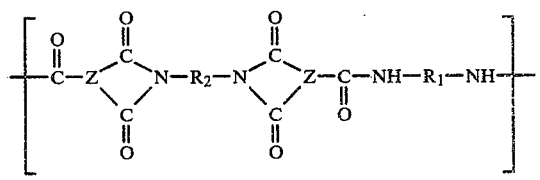

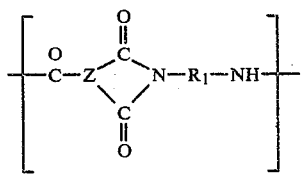

wherein "Z" is a trivalent aromatic radical, R₁ is a divalent aromatic radical of 6 to 20 carbon atoms joined directly or containing stable linkages consisting of —S—, —O—,

—SO₂— —CO— or methylene radicals, R₂ is a divalent aliphatic, cycloaliphatic or araliphatic radical of from 2 to 18 carbon atoms.

9. A process for the preparation of tailored linear injection moldable polyamide-imide copolymers and terpolymers containing both aromatic and aliphatic moieties derived from aromatic and aliphatic diamines which process comprises reacting at a temperature of about 50° to 700° F. fully or partially acylated aromatic or aliphatic diamines with tricarboxylic acid anhydride compounds and aliphatic or aromatic diamines wherein the ratio of the total moles of fully acylated diamines, partially acylated diamines and unacylated diamines to the tricarboxylic acid anhydride compound is 1:1 and about one half of the total amine functionality is acylated (the process of claim 1) wherein the copolymer produced comprises the following structural units:

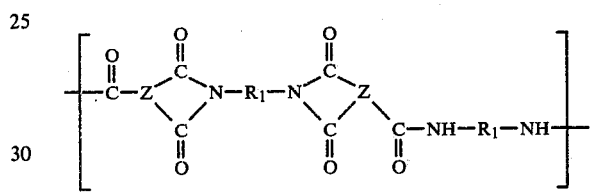

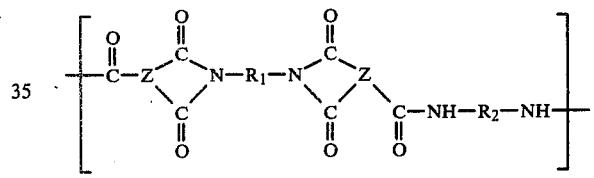

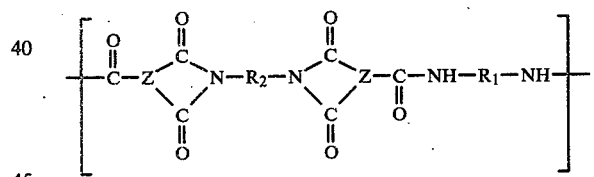

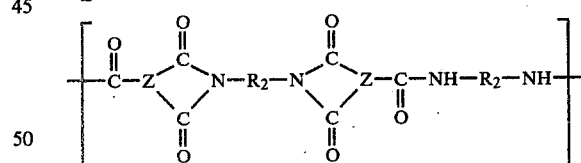

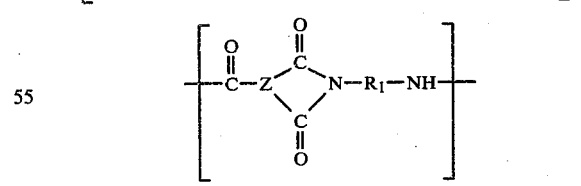

wherein "Z" is a trivalent aromatic radical, R₁ is a divalent aromatic radical of 6 to 20 carbon atoms joined directly or containing stable linkages consisting of —S—, —O—,

—SO₂— —CO— or methylene radicals, R₂ is a divalent aliphatic, cycloaliphatic or araliphatic radical of from 2 to 18 carbon atoms.

10. A process for the preparation of tailored linear injection moldable polyamide-imide copolymers and terpolymers containing both aromatic and aliphatic moieties derived from aromatic and aliphatic diamines which process comprises reacting at a temperature of about 50° to 700° F, fully or partially acylated aromatic or aliphatic diamines with tricarboxylic acid anhydride compounds and aliphatic or aromatic diamines wherein the ratio of the total moles of fully acylated diamines, partially acylated diamines and unacylated diamines to the tricarboxylic acid anhydride compound is 1:1 and at least about one half of the total amine functionality is acylated (the process of claim 1) wherein the copolymer produced comprises the following structural units:

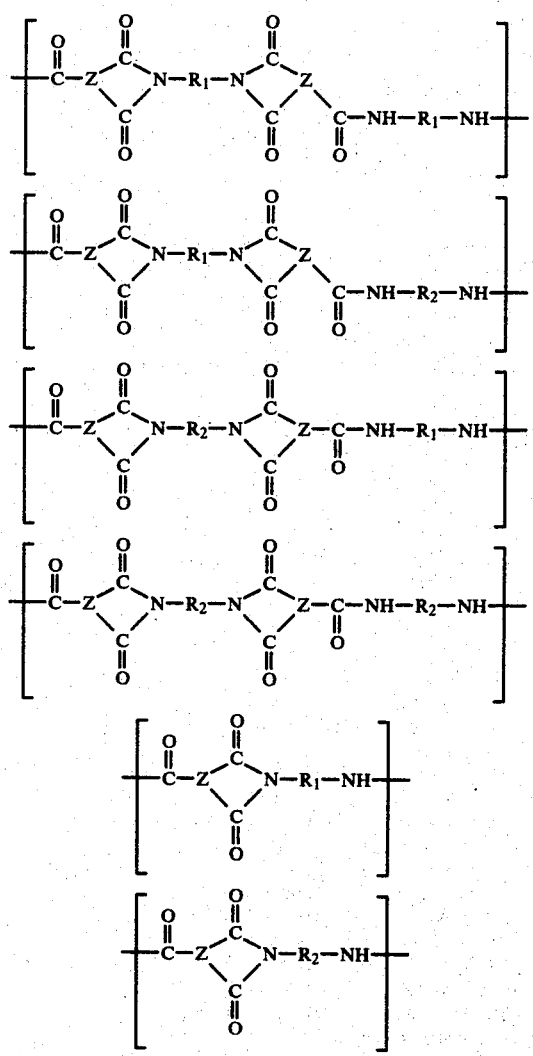

wherein "Z" is a trivalent aromatic radical, R₁ is a divalent aromatic radical of 6 to 20 carbon atoms joined directly or containing stable linkages consisting of —S—, —O—,

—SO₂— —CO— or methylene radicals, R₂ is a divalent aliphatic, cycloaliphatic or araliphatic radical of from 2 to 18 carbon atoms.

11. The process of claim 8 wherein "Z" is

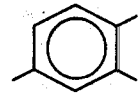

R₁ is

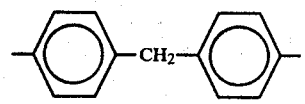

and R₂ is

—(CH₂)₆— and wherein the molar ratio of Z:R₁:R₂ is 4:3:1.

12. The process of claim 8 wherein "Z" is

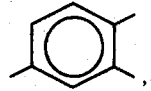

R₁ is

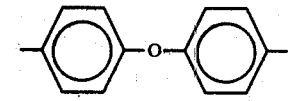

and R₂ is

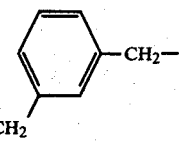

and wherein the molar ratio of Z:R₁:R₂ is 3:2:1.

13. The process of claim 4 wherein "Z" is

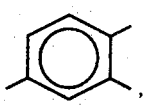

R₁ is

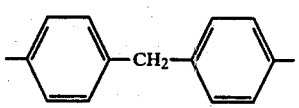

and R₂ is

—(CH₂)₆— and wherein the molar ratio of Z:R₁:R₂ is 4:3:1.

14. The process of claim 7 wherein "Z" is

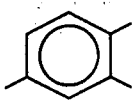, $R_1$ is

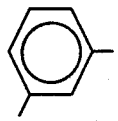

and $R_2$ is

—(CH$_2$)$_6$— and wherein the molar ratio of Z:R$_1$:R$_2$ is 4:3:1.

15. The process of claim 8 wherein "Z" is

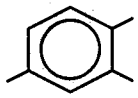, $R_1$ is

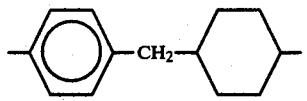

and $R_2$ is

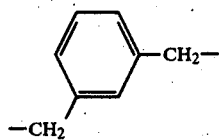

and wherein the molar ratio of Z:R$_1$:R$_2$ is 4:3:1.

16. The process of claim 7 wherein "Z" is

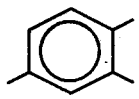, $R_1$ is

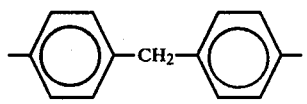

and $R_2$ is

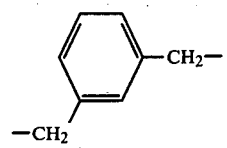

and wherein the molar ratio of Z:R$_1$:R$_2$ is 4:3:1.

17. The process of claim 10 wherein "Z" is

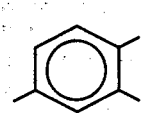, $R_1$ is

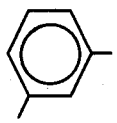

and $R_2$ is

—(CH$_2$)$_6$— and wherein the molar ratio of Z:R$_1$:R$_2$ is 4:3:1.

18. The copolymer and terpolymer prepared according to the process of claim 1 wherein the copolymer and terpolymer is in the form of a molded object.

19. The copolymer produced according to claim 4 wherein the copolymer is in the form of a molded object.

20. The copolymer produced according to claim 8 wherein the copolymer is in the form of a molded object.

21. The copolymer produced according to claim 7 wherein the copolymer is in the form of a molded object.

22. The copolymer produced according to claim 10 wherein the copolymer is in the form of a molded object.

23. As a composition of matter, the copolymer prepared according to claim 4.

24. As a composition of matter, the copolymer prepared according to claim 5.

25. As a composition of matter, the copolymer prepared according to claim 6.

26. As a composition of matter, the copolymer prepared according to claim 7.

27. As a composition of matter, the copolymer prepared according to claim 8.

28. As a composition of matter, the copolymer prepared according to claim 9.

29. As a composition of matter, the copolymer prepared according to claim 10.

30. As a composition of matter, the copolymer prepared according to claim 11.

31. As a composition of matter, the copolymer prepared according to claim 12.

32. As a composition of matter, the copolymer prepared according to claim 13.

33. As a composition of matter, the copolymer prepared according to claim 14.

34. As a composition of matter, the copolymer prepared according to claim 15.

35. As a composition of matter, the copolymer prepared according to claim 16.

36. As a composition of matter, the copolymer prepared according to claim 17.

* * * * *

UNITED STATES PATENT OFFICE
CERTIFICATE OF CORRECTION

Patent No. 4,291,149    Dated September 22, 1981

Inventor(s) Robert G. Keske and James R. Stephens

It is certified that error appears in the above-identified patent and that said Letters Patent are hereby corrected as shown below:

| Col. | Line | |
|---|---|---|
| 1 | 19 | "amide imides" should be --amide-imides-- |
| Abstract | 9 | "amide, and amide-imide" should be --amide, and amide-amide-- |
| 2 | 65 | "para- and metaphenylenediamine" should be --para- and meta-phenylenediamine-- |
| 3 | 37 | "of the aliphatic" should be --the aliphatic-- |
| 3 | 48 | "structural units A and B" should be --Structural Units A and B-- |
| 5 | 26 | "amide imide" should be --amide-imide-- |
| 6 | 32 | "amide-amide" should be --amide-imide-- |
| 6 | 39-40 | "cross linked" should be --cross-linked-- |

UNITED STATES PATENT OFFICE
CERTIFICATE OF CORRECTION

Patent No. 4,291,149          Dated September 22, 1981

Inventor(s) Robert G. Keske and James R. Stephens

It is certified that error appears in the above-identified patent and that said Letters Patent are hereby corrected as shown below:

| Col. | Line | |
|---|---|---|
| 7  | 43 | "condensor" should be --condenser-- |
| 8  | 52 | "collected, the polymer" should be --collected; the polymer-- |
| 10 | 29 | "(768g,(4.0 moles)" should be --768 g (4.0 moles)-- |
| 11 | 34 | "collected, the" should be --collected; the-- |
| 12 | 59 | "(the process of claim 1)" should be omitted |
| 13 | 31 | "(the process of claim 1)" should be omitted |
| 19 | 37 | Claim 15 omitted a circle from 2d drawing, right side should be |

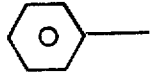

Signed and Sealed this

Fourth Day of May 1982

[SEAL]

Attest:

GERALD J. MOSSINGHOFF

Attesting Officer     Commissioner of Patents and Trademarks